(12) United States Patent
Bales et al.

(10) Patent No.: US 6,711,506 B2
(45) Date of Patent: Mar. 23, 2004

(54) COMPUTERIZED OPERATOR ASSISTANCE FOR TURBINE COMPONENT INSPECTION

(75) Inventors: Maurice J. Bales, Lafayette, CA (US); Brian A. Dalio, Lake Oswego, OR (US); David G. Johnsen, Beaverton, OR (US)

(73) Assignee: Computerized Thermal Imaging, Inc., Ogden, UT (US)

( * ) Notice: Subject to any disclaimer, the term of this patent is extended or adjusted under 35 U.S.C. 154(b) by 114 days.

(21) Appl. No.: 10/006,441

(22) Filed: Nov. 21, 2001

(65) Prior Publication Data

US 2003/0097224 A1 May 22, 2003

(51) Int. Cl.⁷ ................................................. G01B 5/28
(52) U.S. Cl. ........................ 702/35; 702/123; 702/135; 374/141; 374/142; 374/152; 250/341.6
(58) Field of Search ........................ 702/35, 123, 135; 374/5, 141, 142, 152; 250/341.6

(56) References Cited

U.S. PATENT DOCUMENTS

| | | | |
|---|---|---|---|
| 4,644,162 A | 2/1987 | Bantel et al. | 250/340 |
| 5,111,046 A | 5/1992 | Bantel | 250/330 |
| 5,111,048 A * | 5/1992 | Devitt et al. | 250/342 |
| 5,625,196 A | 4/1997 | Williams | 250/559.1 |
| 6,153,889 A * | 11/2000 | Jones | 250/559.45 |
| 6,308,914 B1 | 10/2001 | Spurway et al. | 244/53 R |
| 6,422,743 B1 * | 7/2002 | Nirmalan et al. | 374/43 |
| 6,461,035 B2 * | 10/2002 | Meinlschmidt et al. | 374/5 |

* cited by examiner

*Primary Examiner*—John Barlow
*Assistant Examiner*—Anthony Dougherty
(74) *Attorney, Agent, or Firm*—Schwabe, Williamson & Wyatt Kunzler & Associates

(57) ABSTRACT

A plurality of system checks on a turbine component inspection system are monitored, and an end user interface element to cause an inspection of a turbine component to commence is enabled only upon determining based on the monitored system checks that the inspection system is in a predetermined state of readiness, thereby ensuring each turbine component inspected is stimulated with thermal stimulus having the same characteristics. Further, a binary passed or failed indicator is displayed to unequivocally inform the operator whether a turbine component being inspected passed or failed the inspection. In a preferred embodiment, thermal images of a turbine component's response to applied thermal stimulus, as well as status of automatically launched quantitatively analyses on the turbine component's response to the applied thermal stimulus are also displayed.

44 Claims, 5 Drawing Sheets

COMPUTERIZED OPERATOR ASSISTANCE FOR TURBINE COMPONENT INSPECTION

FIELD OF THE INVENTION

The invention relates to the field of infrared (IR) inspection of turbine components, such as turbine blades, turbine vanes, and other turbine items of the like having internal passages for cooling or other liquid/gas flow. More specifically, the invention relates to computerized assistance provided to an operator on operating an IR inspection system to inspect turbine components.

BACKGROUND OF THE INVENTION

Failure of a turbine component, such as a blade or a vane is costly, and may even be catastrophic. Accordingly, manufacturing a turbine component involves precision casting and machining processes, as each of these processes may introduce variables that affect the quality of the component, and in turn, its performance and reliability.

During the casting process, variables such as core misalignment, inclusions, and the like, can introduce casting defects into the components. Often times, these casting defects in turn may affect the machining process, resulting in machining defects, as well.

For example, a turbine component may include features such as passages, cooling channels and holes. Cooling channels are internal features of the component through which coolants (e.g. in the form of gases) may flow. Because of the internal nature of the cooling channels, cooling channels are, often times, formed during the casting process utilizing casting cores. Defects, such as core misalignments may result in incorrectly formed, sized or blocked cooling channels.

The cooling holes allow the coolant flowing through the component to be exhausted out of the component. The dimension of the cooling holes may be in the range of 10ths of millimeters. Because of the small dimension of the cooling holes, often times, the cooling holes are machined into the component after the casting process. In order to control the precision of machining the cooling holes, an automated process may be utilized for the physical drilling of the holes, such as computerized numerically controlled (CNC) machine.

Drilling the cooling holes by CNC machine involves the CNC machine determining the exact position of the cooling holes in three-dimensional space, accounting for dimensional tolerances. If casting defects, such as core misalignments, affect the dimensions of the component to the extent that the dimensional tolerances are exceeded, the cooling holes may not be drilled properly.

Recently, inspection methods involving thermal signatures of materials, in particular, infrared (IR) detection imaging, are being utilized to inspect and detect defects in the manufacturing of turbine components. A turbine component inspection method utilizing IR imaging involves applying differential thermal stimuli to the turbine components. Often times, applying differential thermal stimuli involves delivering a first thermal stimulus, such as a gas, at a high temperature to the component, and then, following the high temperature thermal stimulus, delivering a second thermal stimulus, such as the gas, at a cold temperature (i.e., cold, relative to the high temperature thermal stimulus) to the turbine component. An example of an IR inspection apparatus may be found in co-pending U.S. Provisional Pat. Application No. 60/339,725, titled AN IMPROVED TURBINE COMPONENT INSPECTION SYSTEM, filed on Nov. 1, 2001, and having at least partial common inventorship with the present application. The application is incorporated herein in its entirety by reference.

To ensure the high precision turbine components are inspected properly, the inspection itself, including e.g. the application of the thermal stimulus, is preferably performed with great precision each time, with the inspection system properly calibrated. Moreover, minimal to virtually no judgment should be required of the operators, to avoid human error. Prior known systems all suffer from varying degrees of not able to ensure consistent application of thermal stimuli to inspections of different turbine components or different inspections of the same turbine component. Moreover, too often, too much operator judgment is required in determining whether a turbine component passed or failed an inspection. Thus, a computer assisted method, including a user friendly operator interface, to assist an operator in using such IR inspection system properly to inspect turbine components, without at least some of the prior art shortcomings, is desired.

SUMMARY OF INVENTION

In accordance with a first aspect of the present invention, a plurality of system checks on a turbine component inspection system are monitored, and an end user interface element to cause an inspection of a turbine component to commence is enabled only upon determining, based on the monitored system checks, that the inspection system is in a predetermined state of readiness, thereby ensuring each turbine component inspected is stimulated with thermal stimuli having substantially the same characteristics, such as temperature, pressure, and so forth.

Further, in accordance with another aspect of the present invention, a binary passed or failed indicator is displayed to unequivocally inform the operator whether a turbine component being inspected passed or failed the inspection. In one embodiment, machine check in addition to binary passed or failed may also be indicated.

In a preferred embodiment, thermal images of a turbine component's response to applied thermal stimuli, as well as status of automatically launched quantitative analyses of the turbine component's response to the applied thermal stimuli are also displayed.

In one embodiment, entry of an identifier, as well as inspection comments for each turbine component inspected are also facilitated. Further, affirmative indications by an operator on the completion of inspection of a turbine component as well as for a batch of turbine components are facilitated.

In one embodiment, a computing apparatus is equipped with executable instructions to assist an operator in systematically completing the operations in the desired order, and controlled manner. The executable instructions include provision of an user interface having user interface elements and supported logic to correspondingly guide the operator through the operations in the desired order, and controlled manner.

BRIEF DESCRIPTION OF THE DRAWINGS

The invention is illustrated by way of example and not by way of limitation in the figures of the accompanying drawings, in which the like references indicate similar elements and in which.

DETAILED DESCRIPTION OF THE INVENTION

As summarized earlier, the present invention includes the provision of a computer assisted function and associated user interface to assist an operator to use a thermal inspection system to thermally inspect a turbine component in a systematic, consistent, and substantially error free manner.

In the following description, various aspects of the invention will be described. However, it will be apparent that the invention may be practiced with only some or all described aspects. For purposes of explanation, specific numbers, materials and configurations are set forth in order to provide a thorough understanding of the invention. However, it will also be apparent that the invention may be practiced without the specific details. In other instances, well-known features are omitted or simplified in order not to obscure the invention.

Parts of the description will be presented in terms of operations performed by a digital system, using terms such as data, tables, prompting, determining, and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical, electrical, and optical components of the digital system. The term digital system includes general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation, and selected ones of these operations may also be performed in parallel.

Further, the description repeatedly uses the phrase "in one embodiment", which ordinarily does not refer to the same embodiment, although it may.

Overview

Figure 1:
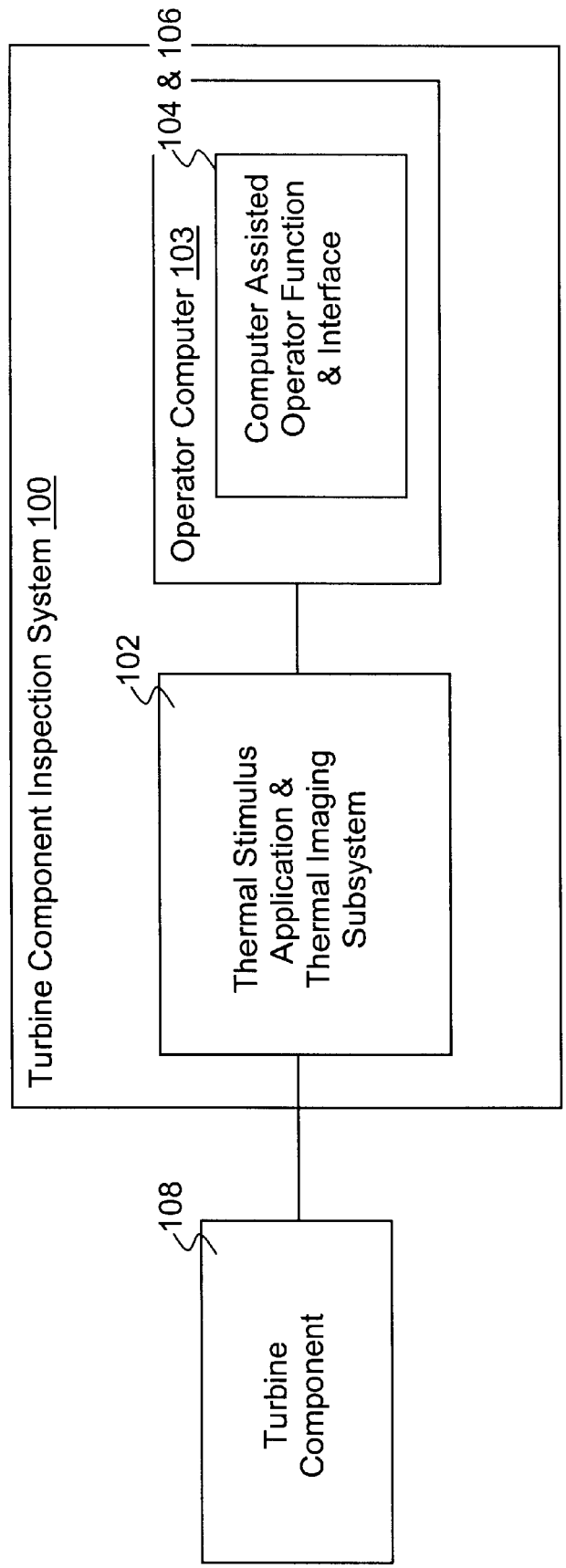
FIG. 1 illustrates an overview of the present invention.

Referring now to FIG. 1, wherein a block diagram illustrating an overview of the present invention is shown. As illustrated, turbine component inspection system 100, used to thermally inspect turbine component 108, comprises thermal stimulus application and thermal imaging subsystem 102, augmented with operator computer 103. For the embodiment, operator computer 103 includes in particular, computer assisted operator function and interface 104 and 106, to assist an operator using subsystem 102 to inspect turbine component 108. As will be described in more detail below, computer assisted operator function and interface 104 and 106 assist an operator to inspect one or more batches of turbine components in a systematic, consistent and substantially error free manner.

Turbine component 108 represents a broad range of components, such as turbine blades, turbine vanes or other turbine items of the like, having e.g. internal passages or cooling channels that lend themselves to thermal inspection, i.e. inspection through analysis of the thermal signatures of these turbine components responsive to application of thermal stimuli. Similarly, turbine component inspection system 100 represents a broad range of turbine component thermal inspection system, including but are not limited to the inspection system disclosed in the aforementioned co-pending patent application No. 60/339,725.

Operation Flow

Figure 2A:
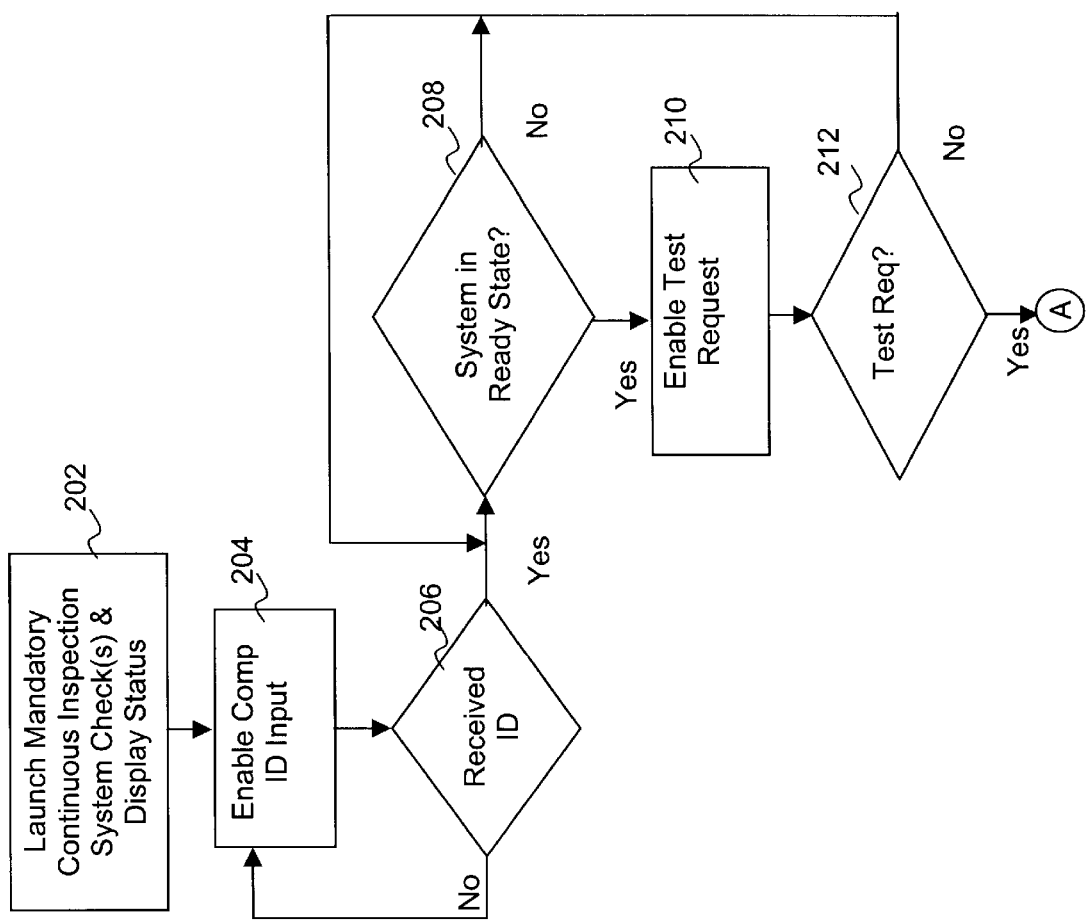
FIGS. 2a–2b illustrate the operational flow of the relevant aspects of the computer assisted operator function of FIG. 1 in further detail, in accordance with one embodiment.
Figure 2B:
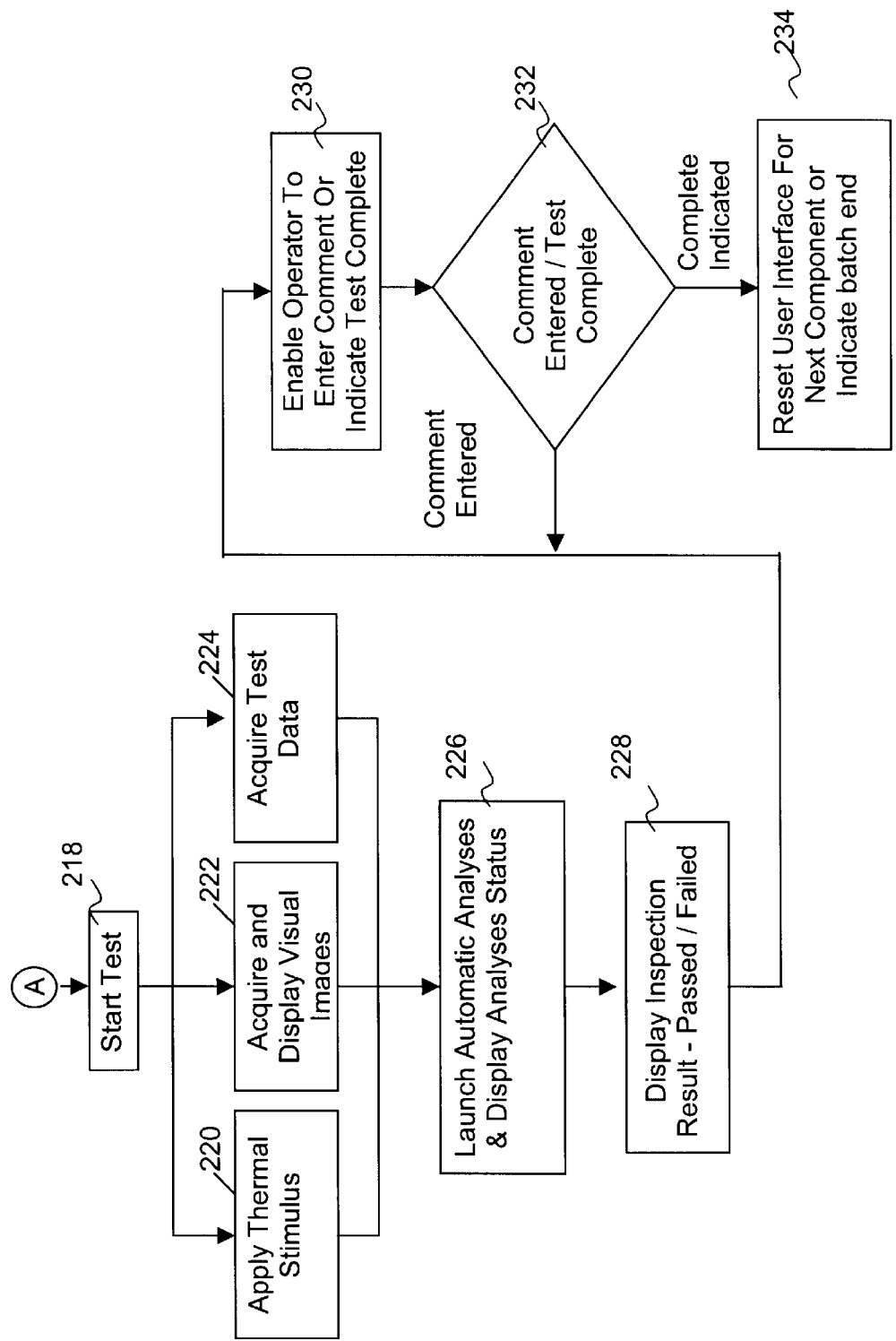

FIGS. 2a–2b illustrate the operation flow of the relevant aspects of computer assisted operator function 104, in accordance with one embodiment. As illustrated, at the beginning of operation, function 104 first starts monitoring of a number of system checks on component inspection system 102, block 202. In one embodiment, these system checks include system checks to ensure the respective elements of component inspection system 102 responsible for delivering hot and cold thermal stimuli to a turbine component to be inspected are operating properly. In one embodiment, these system checks further include system checks to ensure other aspects, such as pressure, humidity, and so on, of component inspection system 102 are at appropriate levels/states. In one embodiment, the monitoring is performed continuously. Further, selected ones of the results of the monitoring, i.e. whether the elements of component inspection system 102 are considered to be in respective pre-determined ready states are displayed for the operator. In one embodiment, component inspection system 102 are equipped with proper sensors to provide the necessary readings on the operating states of the respective elements/subsystems responsible for or otherwise may affect delivery of hot and cold thermal stimuli to a turbine component to be inspected.

Next, function 104 enables a first end user interface element for an operator to indicate a desire to commence inspection of a turbine component. For the illustrated embodiment, function 104 enables a first end user interface element for the operator to indicate the desire by entering an identifier for a turbine component to be inspected, block 204. For the embodiment, the inspection process remains at this stage, until such an identifier is provided for the next turbine component to be inspected, block 206, thus ensuring each turbine component being inspected is properly identified. In one embodiment, the provided identifier is further augmented with the date and time the identifier is entered, thus ensuring the inspection data collected for each inspection of each turbine component may be properly identified. In alternate embodiments, other techniques to convey the operator's desire to commence an inspection may also be practiced instead. Further, entry of an identifier for a turbine component may be automated, e.g. through scanning of UPC codes attached to the turbine component to be inspected, or other techniques of the like.

Upon being provided with an identifier for the next turbine component to be inspected, function 104 advantageously determines, based on the monitored system checks, whether inspection system 102 is at a pre-determined readiness state, before allowing inspection of a turbine component to proceed, blocks 208. For the illustrated embodiment, function 104 advantageously enables an end user interface element for an operator to cause an inspection to commence, block 210, only upon determining based on the monitored system checks, inspection system 102 is at the pre-determined readiness state.

In one embodiment, function 104 continues the monitoring operations even after enabling the end user interface element. If inspection system 102 ever ceases to be in the predetermined readiness state, function 104 reverts and disables the end user interface elements (or terminating the inspection in progress, if applicable).

In one embodiment, if inspection system 102 never reaches the pre-determined readiness state, the end user element for causing commencement of an inspection remains disabled, thereby effectively preventing the inspection system 102 from being used, thereby avoiding inaccurate and/or inconsistent use. In alternate embodiments, additional logic may be provided to attempt to correct one or more correctable conditions keeping inspection system 102 from reaching the predetermined readiness state.

In one embodiment, inspection system 102 is at the pre-determined readiness state if the monitored system checks reveal that the respective elements responsible for or otherwise affect the delivery of hot and cold thermal stimuli are ready to precisely and consistently deliver the thermal stimuli with pre-determined characteristics, such as certain predetermined temperature levels. These readiness attributes, in addition to temperature, may also include pressure, humidity and so forth.

As will be appreciated by those skilled in the art, by ensuring that inspection system 102 is at the pre-determined readiness state, the present invention advantageously ensures that thermal stimuli with substantially the same characteristics are applied for each inspection. In other words, the present invention advantageously ensures thermal stimuli with substantially the same characteristics are applied to different turbine components, or to different inspections of the same turbine component.

Assuming inspection system 102 is operating properly, and reaches the required pre-determined readiness state in due course, eventually, an affirmative request to inspect a turbine component is received while inspection system 102 is at the pre-determined readiness state, block 212. In response, function 104 causes inspection of the turbine component to commence, block 218.

For the illustrated embodiment, commencement of the inspection of the turbine component involves concurrent application of thermal stimuli with the predetermined characteristics, block 220, acquisition of thermal images of the turbine component capturing its thermal response to the application of the thermal stimuli, block 222, as well as collection of any other test data of interest, block 224. In one embodiment, the acquired thermal images are advantageously displayed for the operator in real time, block 222.

For the embodiment, function 104 further launches a number of quantitative analyses of the thermal responses of the turbine component being inspected, block 226. The quantitative analyses are launched to enable a binary conclusion to be reached on whether the turbine component being inspected passed or failed the inspection, and the conclusion be unequivocally presented to the operator, block 228. In alternate embodiments, in addition to passed or failed result, the analyses function may return an "error" or "machine check" instead, if it is unable to definitively conclude that the inspection has passed or failed.

Accordingly, the present invention also advantageously removes operator judgment in concluding whether a turbine component being inspected passed or failed the inspection, thereby increasing the accuracy and precision of the inspections.

Any number of automated quantitative analyses of the thermal responses of the turbine component being inspected may be employed to practice the present invention. For example, in one embodiment, the thermal image of a turbine component at a particular thermal threshold may be compared to a reference thermal image of a known good turbine component at the same thermal threshold, using neural network based image recognition techniques. In another embodiment, analyses may be streamlined to certain predetermined regions of interest, and moment analyses may be performed to analyze the thermal image of a turbine under inspection in each of the predetermined regions of interest. Interest regions based quantitative analyses of thermal response of a turbine component being inspected is the subject matter of copending application, 10/006,436, entitled "Automated Analyses of Thermal Responses of Turbine Components", contemporaneously filed. The application is hereby fully incorporated in its entirety by reference.

In one embodiment, the status of the quantitative analyses performed is also displayed while the quantitative analyses are being performed, block 226.

For the illustrated embodiment, upon causing the inspection to be performed, i.e. application of the thermal stimuli, acquisition of thermal images and test data, automatic analyses of the turbine component's thermal response, and concluding whether the turbine component passed or failed the inspection, function 104 enables the operator to enter comments for the inspection performed, and upon entry of the comments, if any, to affirmatively indicate inspection of the particular turbine component has been completed, block 230. As before, the process remains at this stage, until affirmative indication of inspection complete for the turbine component is received, block 232.

Upon receipt of the inspection complete indication for a turbine component, function 104, resets the computer assisted operator interface 106, block 234, to enable repeat of the process for the same turbine component or for another turbine component, starting at block 202, as earlier described.

For the embodiment, without reset, entry of another identifier for another turbine component is not possible, thereby ensuring inspection of turbine components is orderly accomplished, in addition to being accurately, precisely and consistently performed.

In one embodiment, function 104 further enables the operator to indicate that inspection of an entire batch of turbine components has been completed.

Thus, it can be seen from the above description, by systematically monitoring readiness of inspection system 102, guiding an operator through the inspection process in an orderly, automated, substantially judgment free manner, accuracy, consistency or precision of the inspection results is enhanced.

User Interface

Figure 3:
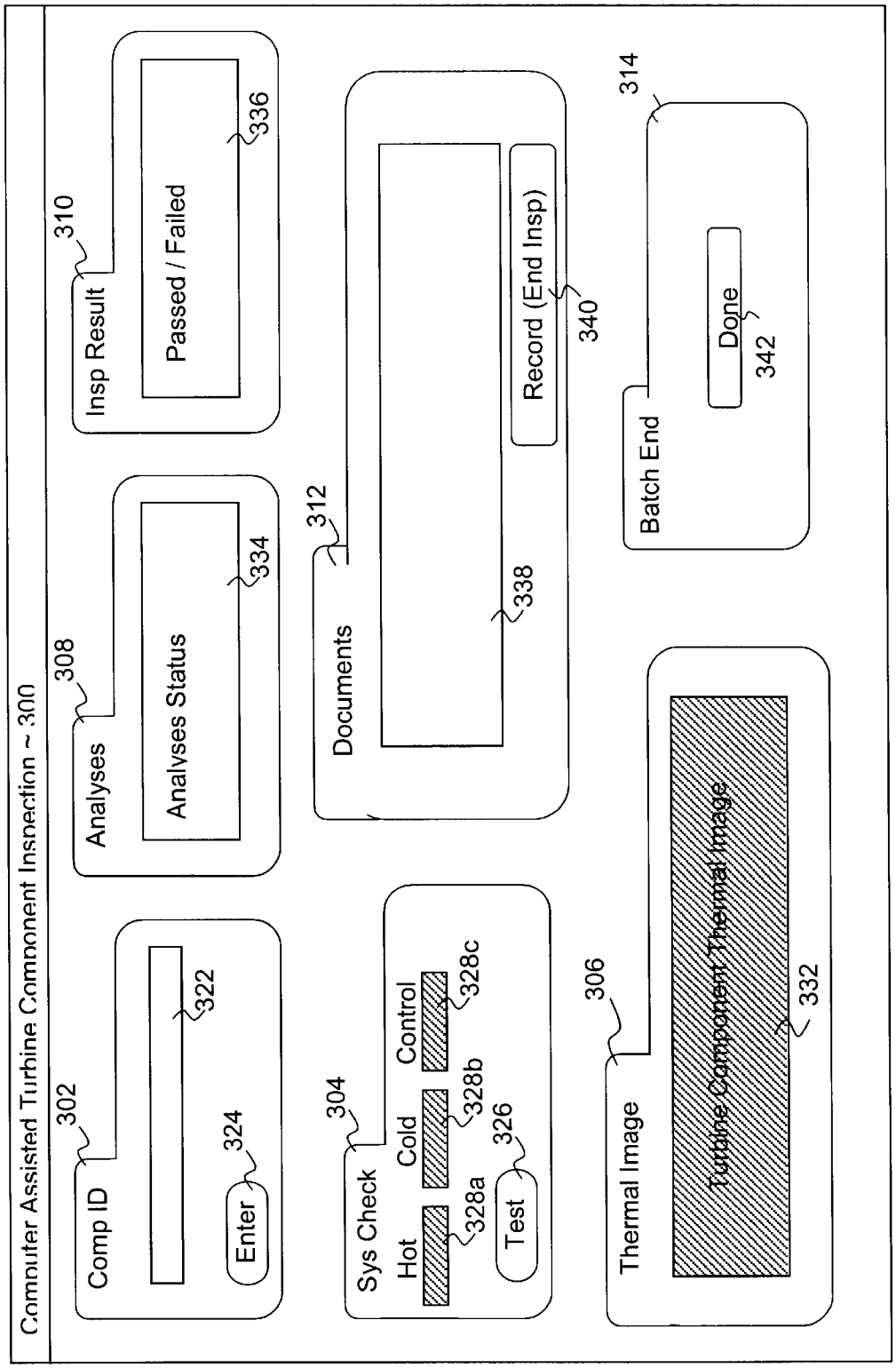
FIG. 3 illustrates the computer assisted operator interface of FIG. 1 in further detail, in accordance with one embodiment.

FIG. 3 illustrates user interface 106 of FIG. 1 in further detail, in accordance with one embodiment. As illustrated, for the embodiment, interface 300 includes a number of interface elements 302–314. Interface element 302 includes a field 322 for entry of an identifier for a turbine component to be inspected, and a button 324 for submitting the identifier entered. Interface 304 includes a number of displays 328a–328c displaying the results of the monitored system checks, and button 326 to cause inspection of a turbine component to commence. For the embodiment, three displays 328a–328c are shown, one each for a "hot" thermal stimulus system check, a "cold" thermal stimulus system check, and a "control" check respectively. In alternate embodiments, states of other attributes, such as pressure, humidity and so forth may also be displayed.

Interface element 306 includes the thermal images 332 displayed for the turbine component, while they are acquired when thermal stimuli are applied to the turbine component being inspected. Interface element 308 includes the statuses 334 displayed for the various automatic quantitative analyses performed on the thermal responses of the turbine component being inspected. Interface element 310 includes a status 336 denoting whether the turbine component being inspected passed or failed the inspection. In an alternate embodiment, as described earlier, status 336 may be "machine check" also.

Interface element 312 includes a field 338 for entry of comments by an operator with respect to the inspection being performed, and a button 340 to cause the entered comment to be recorded as well as affirmatively indicating that inspection for the current turbine component has been completed.

Finally, interface element 314 includes a button 342 to enable an affirmative indication that inspection of an entire batch of turbine component has been completed.

Example Computer System

Figure 4:
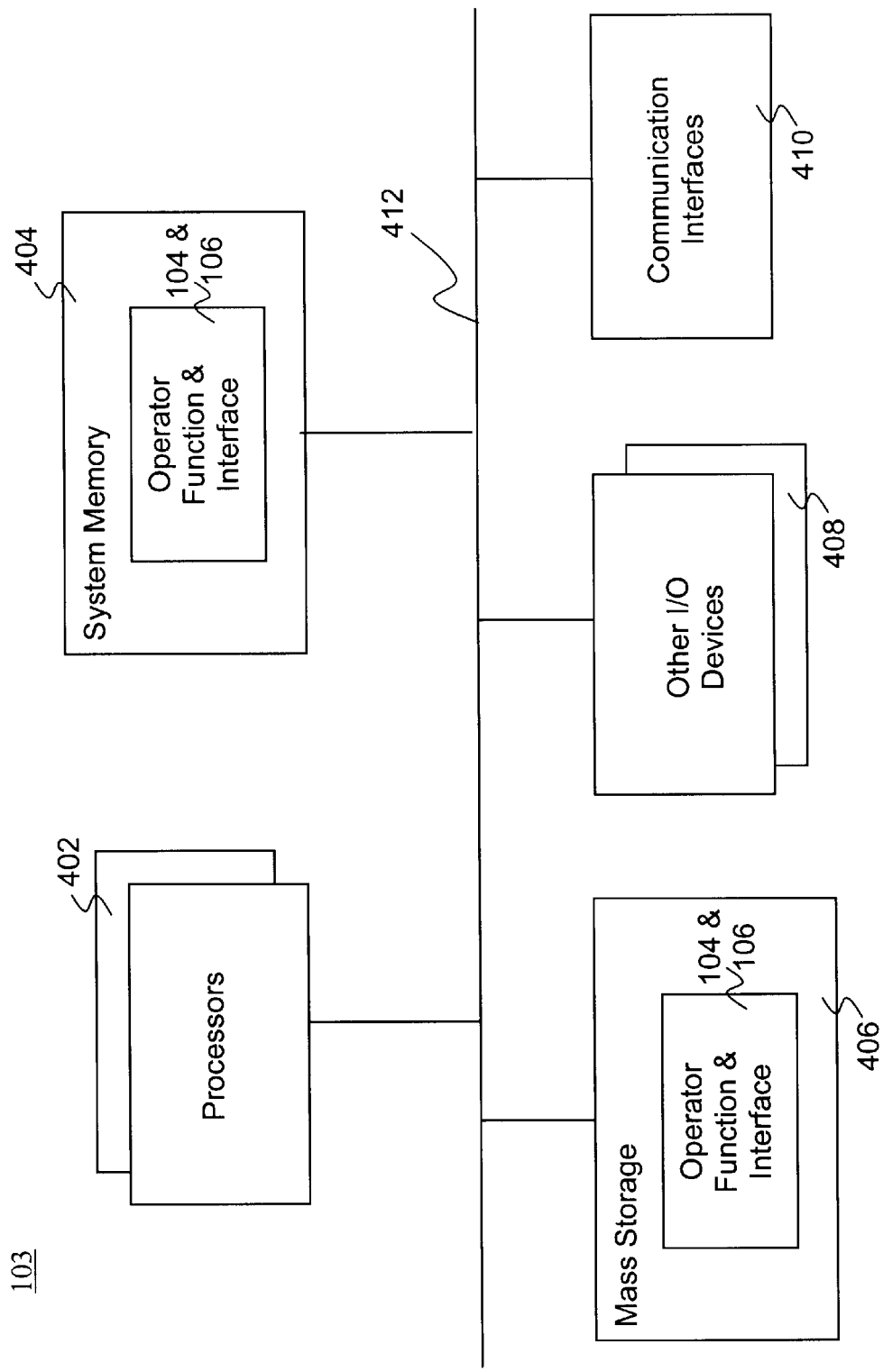
FIG. 4 illustrates a computer system suitable for use to practice the present invention, in accordance with one embodiment.

FIG. 4 illustrates one embodiment of an exemplary digital system suitable for use as operator computer 103 of FIG. 1 to practice the present invention. As shown, exemplary digital system 103 includes one or more processors 402 and system memory 404. Additionally, system 400 includes mass storage devices 406 (such as diskette, hard drive, CDROM and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, the buses are bridged by one or more bus bridges (not shown). Each of these elements performs its conventional functions known in the art. In particular, system memory 404 and mass storage 406 are employed to store a working copy and a permanent copy of the programming instructions implementing the teachings of the present invention (computer assisted operation function and interface 104–106). The permanent copy of the programming instructions may be loaded into mass storage 406 in the factory, or in the field, through a distribution medium (not shown) or through communication interface 410 (from a distribution server (not shown). The constitution of these elements 402–412 are known, and accordingly will not be further described.

Conclusion and Epilog

Thus, a novel method and apparatus for assisting an operator in using a thermal turbine component inspection system to inspect turbine components has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a computer, a method of operation to provide computerized assistance to an operator of a turbine component inspection system, using the turbine component inspection system to inspect a turbine component, the method of operation comprising:

automatically monitoring a plurality of system checks on the turbine component inspection system;

enabling the operator to indicate a first desire to commence inspection of a first turbine component using the monitored turbine component inspection system;

receiving said indication of the first desire to commence inspection of the first turbine component using the monitored turbine component inspection system;

in response, determining, based on said monitored system checks, whether the turbine component inspection system is in a pre-determined state of readiness; and enabling inspection of the first turbine component to commence, only upon determining that the turbine component inspection system is in the pre-determined state of readiness.

2. The method of claim 1, wherein said automatic monitoring comprises monitoring a system check on the readiness of a plurality of elements of the turbine component inspection system to deliver hot thermal stimulus having predetermined characteristics to the first turbine component to be inspected.

3. The method of claim 1, wherein said automatic monitoring comprises monitoring a system check on the readiness of a plurality of elements of the turbine component inspection system to deliver cold thermal stimulus having predetermined characteristics to the first turbine component to be inspected.

4. The method of claim 1, wherein said enabling of an operator to indicate a first desire to commence inspection of the first turbine component using the monitored turbine component inspection system comprises enabling the operator to enter a first identifier for the first turbine component to be inspected using the monitored turbine component inspection system.

5. The method of claim 1, wherein said receiving of the indication of the first desire to commence inspection of the first turbine component using the monitored turbine component inspection system comprises receiving from the operator a first identifier for the first turbine component to be inspected using the monitored turbine component inspection system.

6. The method of claim 1, wherein said determining comprises determining, based on one or more monitored system checks, whether a plurality of elements of the turbine component inspection system are ready to deliver hot thermal stimulus having predetermined characteristics to the first turbine component to be inspected.

7. The method of claim 1, wherein said determining comprises determining, based on one or more monitored system checks, whether a plurality of elements of the turbine component inspection system are ready to deliver cold thermal stimulus having predetermined characteristics to the first turbine component to be inspected.

8. The method of claim 1, wherein said conditional enabling of inspection of the turbine component to commence comprises presenting an end user interface element for the operator to cause the inspection to commence, only upon determining that the turbine component inspection system is in the pre-determined state of readiness.

9. The method of claim 1, wherein the method further comprises displaying thermal images of the first turbine component's response to thermal stimulus applied by the turbine component inspection system to the first turbine component.

10. The method of claim 1, wherein the method further comprises displaying for the operator a definitive indication on whether the first turbine component passed or failed the inspection.

11. The method of claim 1, wherein the method further comprises facilitating entry of comments by the operator on said inspection of the first turbine component.

12. The method of claim 1, wherein the method further comprises providing an end user interface element for the operator to affirmatively denote completion of inspection of said first turbine component.

13. The method of claim 1, wherein the method further comprises
enabling the operator to indicate a second desire to commence inspection of said first turbine component for a second time using the monitored turbine component inspection system;
receiving said indication of the second desire to commence inspection of the first turbine component for a second time using the monitored turbine component inspection system;
in response, determining, based on said monitored system checks, whether the turbine component inspection system is in the same pre-determined state of readiness; and
enabling inspection of the first turbine component for a second time to commence, only upon determining that the turbine component inspection system is in the same pre-determined state of readiness.

14. The method of claim 1, wherein the method further comprises
enabling the operator to indicate a second desire to commence inspection of a second turbine component using the monitored turbine component inspection system;
receiving said indication of the second desire to commence inspection of the second turbine component for a second time using the monitored turbine component inspection system;
in response, determining, based on said monitored system checks, whether the turbine component inspection system is in a same pre-determined state of readiness; and
enabling inspection of the second turbine component for a second time to commence, only upon determining that the turbine component inspection system is in the same pre-determined state of readiness.

15. The method of claim 1, wherein the method further comprises providing an end user interface element for the operator to affirmatively denote completion of inspection a batch of turbine components.

16. The method of claim 1, wherein said first turbine component is a selected one of a turbine blade and a turbine vane.

17. The method of claim 1, wherein said the method further comprises automatically launching a plurality of quantitative analyses of the first turbine component's response to the thermal stimulus applied.

18. The method of claim 17, wherein said the method further comprises displaying for the operator status of said automatically launched quantitative analyses of the first turbine component's response to the thermal stimulus applied.

19. An apparatus comprising:
storage medium having stored therein a plurality of executable instructions designed to implement a turbine component inspection assistance system, which when executed, enables the apparatus to
automatically monitor a plurality of system checks on a turbine component inspection system,
enable an operator to indicate a first desire to commence inspection of a first turbine component using the monitored turbine component inspection system,
receive said indication of the first desire to commence inspection of the first turbine component using the monitored turbine component inspection system,
in response, determine, based on said monitored system checks, whether the turbine component inspection system is in a pre-determined state of readiness, and
enable inspection of the first turbine component to commence, only upon determining that the turbine component inspection system is in the pre-determined state of readiness; and
at least one processor coupled to the storage medium to execute the executable instructions.

20. The apparatus of claim 19, wherein the programming instructions, when executed, enable the apparatus to monitor a system check on the readiness of a plurality of elements of the turbine component inspection system to deliver hot thermal stimulus having predetermined characteristics to the first turbine component to be inspected.

21. The apparatus of claim 19, wherein the programming instructions, when executed, enable the apparatus to monitor a system check on the readiness of a plurality of elements of the turbine component inspection system to deliver cold thermal stimulus having predetermined characteristics to the first turbine component to be inspected.

22. The apparatus of claim 19, wherein the programming instructions, when executed, enable the apparatus to enable an operator to indicate a first desire to commence inspection of the first turbine component using the monitored turbine component inspection system by enabling the operator to enter a first identifier for the first turbine component to be inspected using the monitored turbine component inspection system.

23. The apparatus of claim 19, wherein the programming instructions, when executed, enable the apparatus to receive the indication of the first desire to commence inspection of the first turbine component using the monitored turbine component inspection system by receiving from the operator a first identifier for the first turbine component to be inspected using the monitored turbine component inspection system.

24. The apparatus of claim 19, wherein the programming instructions, when executed, enable the apparatus to perform said determining by determining, based on one or more monitored system checks, whether a plurality of elements of the turbine component inspection system are ready to deliver hot thermal stimulus having predetermined characteristics to the first turbine component to be inspected.

25. The apparatus of claim 19, wherein the programming instructions, when executed, enable the apparatus to perform said determining by determining, based on one or more monitored system checks, whether a plurality of elements of the turbine component inspection system are ready to deliver cold thermal stimulus having predetermined characteristics to the first turbine component to be inspected.

26. The apparatus of claim 19, wherein the programming instructions, when executed, enable the apparatus to conditionally enable inspection of the turbine component to commence by presenting an end user interface element for the operator to cause the inspection to commence, only upon determining that the turbine component inspection system is in the pre-determined state of readiness.

27. The apparatus of claim 19, wherein the programming instructions, when executed, further enable the apparatus to display thermal images of the first turbine component's response to thermal stimulus applied by the turbine component inspection system to the first turbine component.

28. The apparatus of claim 19, wherein the programming instructions, when executed, further enable the apparatus to automatically launch a plurality of quantitative analyses on the first turbine component's response to the thermal stimulus applied.

29. The apparatus of claim 19, wherein the programming instructions, when executed, further enable the apparatus to display for the operator status of said automatically launched quantitative analyses on the first turbine component's response to the thermal stimulus applied.

30. The apparatus of claim 19, wherein the programming instructions, when executed, further enable the apparatus to display for the operator a definitive indication on whether the first turbine component passed or failed the inspection.

31. The apparatus of claim 19, wherein the programming instructions, when executed, further enable the apparatus to facilitate entry of comments by the operator on said inspection of the first turbine component.

32. The apparatus of claim 19, wherein the programming instructions, when executed, further enable the apparatus to provide an end user interface element for the operator to affirmatively denote completion of inspection of said first turbine component.

33. The apparatus of claim 19, wherein the programming instructions, when execute, further enable the apparatus to
  enable the operator to indicate a second desire to commence inspection of said first turbine component for a second time using the monitored turbine component inspection system,
  receive said indication of the second desire to commence inspection of the first turbine component for a second time using the monitored turbine component inspection system,
  in response, determine, based on said monitored system checks, whether the turbine component inspection system is in the same pre-determined state of readiness, and
  enable inspection of the first turbine component for a second time to commence, only upon determining that the turbine component inspection system is in the pre-determined state of readiness.

34. The apparatus of claim 19, wherein the programming instructions, when executed, further enable the apparatus to
  enable the operator to indicate a second desire to commence inspection of a second turbine component using the monitored turbine component inspection system,
  receive said indication of the second desire to commence inspection of the second turbine component for a second time using the monitored turbine component inspection system,
  in response, determine, based on said monitored system checks, whether the turbine component inspection system is in a pre-determined state of readiness, and
  enable inspection of the second turbine component for a second time to commence, only upon determining that the turbine component inspection system is in the same pre-determined state of readiness.

35. The apparatus of claim 19, wherein the programming instructions, when executed, further enable the apparatus to provide an end user interface element for the operator to affirmatively denote completion of inspection a batch of turbine components.

36. The apparatus of claim 19, wherein said first turbine component is a selected one of a turbine blade and a turbine vane.

37. A computer assisted turbine component inspection user interface comprising:
  a first interface element to display status of a plurality of monitored system checks on a turbine component inspection system to be used to inspect turbine components; and
  a second interface element conditionally enabled only when it is determined based on the monitored system checks the turbine component inspection system is in a pre-determined readiness state, to enable an operator to cause inspection of a turbine component to commence.

38. The user interface of claim 37, wherein the interface further comprises a third interface element for the operator to enter an identifier for a turbine component to be inspected.

39. The user interface of claim 37, wherein the interface further comprises a third interface element to provide a binary indication affirmatively denoting for the operator whether the turbine component passed or failed the inspection.

40. The user interface of claim 39, wherein the interface further comprises a third interface element to display thermal images of the turbine component, responding to application of thermal stimulus to the turbine component by the turbine component inspection system.

41. The user interface of claim 39, wherein the interface further comprises a third interface element to provide status on automatically launched quantitative analyses on the turbine component's response to the thermal stimulus applied.

42. The user interface of claim 39, wherein the interface further comprises a third interface element to facilitate entry of comments by the operator.

43. The user interface of claim 39, wherein the interface further comprises a third interface element to facilitate affirmative indication of completion of testing of the turbine component by the operator.

44. The user interface of claim 39, wherein the interface further comprises a third interface element to facilitate affirmative indication of completion of testing of a batch of turbine components by the operator.

* * * * *

UNITED STATES PATENT AND TRADEMARK OFFICE
CERTIFICATE OF CORRECTION

PATENT NO. : 6,711,506 B2
DATED : March 23, 2004
INVENTOR(S) : Bales et al.

It is certified that error appears in the above-identified patent and that said Letters Patent is hereby corrected as shown below:

<u>Title page,</u>
Item [74], *Attorney, Agent or Firm*, "Wyatt Kunzler" should read -- Wyatt; Kunzler --

<u>Column 4,</u>
Line 22, "system 102," should read -- system 100, --.
Lines 25, 30, 33 and 64, "system 102" should read -- system 100 --.
Line 35, "system 102 are" should read -- system 100 is --.
Line 66, "blocks" should read -- block --.

<u>Column 5,</u>
Lines 3, 7, 11, 15, 18, 20, 30, 38 and 42, "system 102" should read -- system 100 --.

<u>Column 7,</u>
Line 34, "system 400" should read -- system 103 --.

Signed and Sealed this

Fifteenth Day of June, 2004

JON W. DUDAS
*Acting Director of the United States Patent and Trademark Office*